(12) United States Patent
Van Kley

(10) Patent No.: US 7,299,912 B2
(45) Date of Patent: Nov. 27, 2007

(54) CONVEYOR FOR BAR OR PIPE

(75) Inventor: Randy L. Van Kley, Wheatfield, IN (US)

(73) Assignee: Midwest Pipe Coating, Inc., Schererville, IN (US)

( * ) Notice: Subject to any disclaimer, the term of this patent is extended or adjusted under 35 U.S.C. 154(b) by 289 days.

(21) Appl. No.: 11/061,418

(22) Filed: Feb. 18, 2005

(65) Prior Publication Data

US 2006/0185965 A1 Aug. 24, 2006

(51) Int. Cl.
*B65G 29/00* (2006.01)
*B65G 13/02* (2006.01)

(52) U.S. Cl. ............................. 198/468.11; 198/468.9; 198/690.2; 198/785

(58) Field of Classification Search ............ 198/468.9, 198/468.11, 690.2, 785; 118/207, 208, 305, 118/DIG. 11
See application file for complete search history.

(56) References Cited

U.S. PATENT DOCUMENTS

| | | | |
|---|---|---|---|
| 1,021,582 A | | 3/1912 | Daniels et al. |
| 2,169,624 A | | 8/1939 | Weiss et al. |
| 2,597,941 A | | 5/1952 | Long |
| 2,715,958 A | | 8/1955 | Lindstrom et al. |
| 2,813,617 A | * | 11/1957 | Sheetz ........................ 198/454 |
| 2,860,766 A | | 11/1958 | Welter |
| 2,873,840 A | | 2/1959 | Kerr et al. |
| 2,925,166 A | * | 2/1960 | Sawdey ................. 198/370.09 |
| 2,948,991 A | | 8/1960 | Walters et al. |
| 3,021,939 A | * | 2/1962 | Hopkins et al. ............ 198/822 |
| 3,063,533 A | | 11/1962 | Cook |
| 3,071,236 A | | 1/1963 | Hahn et al. |
| 3,245,380 A | * | 4/1966 | Carroll ........................ 118/324 |
| 3,687,706 A | * | 8/1972 | Stanley et al. ............... 427/184 |
| 3,964,435 A | | 6/1976 | Horn et al. |
| 4,140,216 A | * | 2/1979 | Conrad ........................ 198/835 |
| 4,166,526 A | | 9/1979 | Wykes et al. |
| 4,298,043 A | * | 11/1981 | Seffens ..................... 144/136.1 |
| 4,358,008 A | * | 11/1982 | Hillier .......................... 193/37 |
| 4,403,688 A | * | 9/1983 | Livia et al. .................. 198/785 |
| 4,448,296 A | | 5/1984 | Tabler |
| 4,593,807 A | | 6/1986 | Cattaneo et al. |
| 4,676,361 A | * | 6/1987 | Heisler ........................ 198/394 |
| 4,747,480 A | * | 5/1988 | Wedler et al. ............... 198/396 |
| 4,869,201 A | * | 9/1989 | Takahashi et al. .......... 118/308 |
| 5,052,543 A | * | 10/1991 | Hagan ......................... 198/387 |

(Continued)

*Primary Examiner*—Douglas A Hess
(74) *Attorney, Agent, or Firm*—Moss & Barnett

(57) ABSTRACT

A conveyor system for transporting a work piece from a beginning point to an end point in a longitudinal direction with at least one process step applied in between to such work piece is provided according to the invention. The work piece is propelled in the longitudinal direction over a combination of grooved rollers and conveyor belt units in series. Grooved guide means with, e.g., V, U, or square shapes that are machined into the surface of the rollers prevent the work piece from moving laterally as it is transported in the longitudinal direction, and maintain precise spacing between a plurality of work piece strands undergoing simultaneous transport by the conveyor system. The conveyor belt unit located between the grooved rollers inhibits rotation of the work piece as it is transported in the longitudinal direction. This conveyor system is good for treating the entire exterior surface area of the work piece in a uniform manner, such as coating the surface of rebar, dowel bar, hollow tube, or pipe.

32 Claims, 11 Drawing Sheets

U.S. PATENT DOCUMENTS

| | | | |
|---|---|---|---|
| 5,450,943 A * | 9/1995 | Yew et al. | 198/468.6 |
| 5,472,080 A * | 12/1995 | Fukuoka | 198/817 |
| 5,944,078 A * | 8/1999 | Lindholm | 144/248.5 |
| 6,164,431 A * | 12/2000 | Morisod | 198/415 |
| 6,170,637 B1 * | 1/2001 | Ishii | 198/443 |
| 6,431,343 B1 * | 8/2002 | Lehtola et al. | 198/413 |
| 6,913,136 B2 * | 7/2005 | van den Dungen et al. | 198/620 |
| 7,137,501 B2 * | 11/2006 | Van Wijngaarden et al. | 198/384 |

* cited by examiner

CONVEYOR FOR BAR OR PIPE

FIELD OF THE INVENTION

This invention relates to an apparatus for conveying a work piece like bar or pipe between stations of a finishing process in a longitudinally aligned, laterally spaced, and non-rotational manner, and a process for finishing such work piece.

BACKGROUND OF THE INVENTION

Principal end products of the steel making industry include bars, including rebar and dowel bar, and extruded tubing including pipe. Iron ore is fed into a huge blast furnace operated at a very high temperature to which is added coke or coal as a reducing agent to remove oxygen from the iron ore. The resulting molten iron is then added to scrap steel that has been heated in a separate furnace, and pure oxygen is blown into the mixture, whereby the oxygen reacts with iron and impurities in the charge to produce the heat necessary to refine the charge into steel. This molten steel may be poured through a mold, cooled and rolled into blooms, billets, and slabs, which can then be hot rolled by means of the grooved rolls of a bar mill to produce steel bars. Alternatively, the heated steel may be forced through a die to form seamless steel tubing and pipe.

Such solid bar may have grooves formed on its exterior surface to produce reinforced bar ("rebar"), which is widely used within the construction industry to reinforce poured concrete against the effects of environmental stress. Solid bar with a smooth exterior surface is called "dowel bar", and is used for highway construction, primarily as a support piece in concrete (for example, as a component of a dowel bar basket assembly. Hollow metal tubing or pipe is used extensively within the utility industry to transmit oil, gas, and water.

Rebar set in concrete can easily corrode over time, which will reduce its effectiveness in reinforcing the concrete. Likewise, piping laid in the ground can corrode over time due to groundwater and acidic materials contained in the soil. Therefore, it is important to render such rebar and piping corrosion-resistant through the application of a protective surface coating. While steel is commonly hot-dip galvanized with molten zinc for heating ducts and storage tanks, or electroplated with chromium for the manufacture of cans and other containers, rebar and piping manufacturers have gravitated towards the use of liquid or powder coatings that may be sprayed onto the rebar or pipe as it travels at high speeds over conveyor lines within the manufacturing plant.

Flat conveyor belts have been used for a long time by the manufacturing industry to convey products between different work stations within the manufacturing process. Similarly, idle wheels can be used on gravity-type conveyors to support the products as they move along the conveyor line. However, products or boxes can easily fall off a conveyor belt or series of roller wheels, so lateral edges or guide rings are commonly applied to the edges of such conveyor lines to prevent undue lateral movement of the load during transport which could otherwise require the conveyor line to be stopped to retrieve the fallen load. See, e.g., U.S. Pat. No. 4,448,296 issued to Tabler.

The circular cross section of rebar or pipe, however, permits such products freely to roll laterally while traveling along a conveyor belt or gravity-type conveyor. Such uncontrolled lateral movement can lead to the strands of rebar or pipe becoming tangled or jammed on the conveyor line. Therefore, conveyor lines have been equipped with rollers having V-shaped or U-shaped grooves for restraining a rebar or pipe strand against lateral movement while it is transported longitudinally over the roller. See, e.g., U.S. Pat. No. 3,063,533 issued to Cook; U.S. Pat. No. 3,964,435 issued to Horn et al.; and U.S. Pat. No. 2,715,958 issued to Lindstrom et al. Such devices typically employ a motorized chain and sprocket assembly for providing the necessary propulsive force that transports the rebar or pipe longitudinally over the conveyor line.

Depending upon the manufacturing step that is being undertaken, it can be important to properly orient loads on a conveyor line so that they are evenly spaced across the width of the conveyor. For example, U.S. Pat. No. 4,166,526 issued to Wykes et al. uses first and second divider discs with guide faces to pre-separate metal bars undergoing transport prior to their passage over a magnetic roller that laterally spaces the bars with uniform spaces between each bar. Similarly, U.S. Pat. No. 3,071,236 issued to Hahn et al. employs V-belts on a conveyor line to place crackers in aligned orientation across the width of the conveyor line.

Once pipe has been laterally aligned and transported along the length of a conveyor line with V-shaped rollers, a throat plate can be employed to stop the movement of a pipe strand until the previous pipe strand has passed to avoid collisions. See U.S. Pat. No. 2,597,941 issued to Long. U.S. Pat. No. 2,169,624 issued to Weiss et al. discloses the use of idler rollers made of rubber for providing a shock resistant and non-abrasive means for transporting material over a conveyor line.

Other known pipe conveyors include mechanisms for transporting the pipe laterally from one conveyor line to another conveyor line or to a run-off table. See, e.g., U.S. Pat. No. 4,593,807 issued to Cattaneo et al.; U.S. Pat. No. 2,873,840 issued to Kerr et al.; and U.S. Pat. No. 1,021,582 issued to Daniels et al.

While such devices previously known within the industry may be capable of aligning rebar or pipe across the width of a conveyor line for evenly spaced longitudinal transport along the line until they are moved to another line or receiving station, the exterior grooves of rebar often interact with the V-shaped grooves of the conveyor line feed rollers to cause the rebar to rotate during transport. Likewise, vibration induced upon dowel bar or pipe by such V-shaped grooves can cause such dowel bar or pipe to rotate. Were such bar or pipe merely being transported by the conveyor line between work stations or during a quenching operation, this rotation would not be problematic. However, during a surface coating process or an abrasion cleaning process prior to such coating, the entire exterior surface of the rebar or pipe must be accessible to the abrasion cleaning medium and coating product, or else the rebar or pipe surface will be unevenly coated. Rotation of the rebar or pipe during transport can interfere with this continuous abrasion cleaning and coating process.

Therefore, it would be very advantageous to provide a continuous means for transporting multiple strands of rebar or pipe along a conveyor line with controlled lateral spacing between the rebar or pipe strands and without rotation so that all of their exterior surface area may be accessible during the abrasion cleaning and coating processes. Moreover, the conveyor line downstream of the coating process must be designed to prevent chipping of the protective coating from the rebar or pipe after it has been applied.

SUMMARY OF THE INVENTION

A conveyor system for transporting a work piece from a beginning point to an end point in a longitudinal direction with at least one process step applied in between to such work piece is provided according to the invention. A support frame secures a combination of grooved rollers and conveyor belt units in series over which the work piece is propelled in the longitudinal direction. Grooved guide means with, e.g., V, U, or square shapes that are machined into the surface of the rollers prevent the work piece from moving laterally as it is transported in the longitudinal direction, and maintain precise spacing between a plurality of work piece strands undergoing simultaneous transport by the conveyor system. The conveyor belt unit located between the grooved rollers inhibits rotation of the work piece as it is transported in the longitudinal direction. Such work piece can include without limitation rebar, dowel bar, hollow tube, and pipe. The process step applied to the work piece undergoing transport longitudinally with controlled lateral and non-rotational spacing by the conveyor system of this invention can include without limitation cleaning, painting, varnishing, coating, or other types of surface treatment where the entire exterior surface area of the work piece should be treated in a uniform manner.

DETAILED DESCRIPTION OF THE PREFERRED EMBODIMENT

A process for the continuous transport of multiple strands of pipe or rebar with controlled lateral spacing in a longitudinal direction along a conveyor line without rotation is provided by the invention. Such invention may take the form of feed rollers having V-shaped grooves for controlling the lateral spacing of the rebar or pipe during longitudinal transport over the conveyor line interspersed with sections of flat conveyor belts for arresting the rotational force applied to the rebar or pipe by the feed rollers. This invention also provides an apparatus for transporting the rebar or pipe with controlled lateral spacing without rotation.

For purposes of the present invention, "work piece" means rebar, dowel bar, hollow tube, pipe, or any other product transported along a conveyor line where the surface area of such work piece must be maintained in place against lateral or rotational movement while the work piece is transported in a longitudinal direction to enhance a process step. The cross section of such work pieces need not be round, but may adopt other shapes like shapes that are, e.g., square, rectangular, hexagonal, or octagonal.

As used within this application, "process step" means any automatic treatment of a work piece as part of a manufacturing process where it is important or desirable to treat the entire surface area of the work piece in a uniform manner. Cleaning, painting, varnishing, coating, or other types of metal treatment represent illustrative examples of such a process step.

In the context of the present invention, "rebar" means any solid steel bar with exterior ribbing or other abrasive surface areas that is used to reinforce concrete structures like roadways, highways, retaining walls, and building walls. Rebar typically has a round cross-section with a diameter between 3/8 inches and 1 inch or more, and its standard length is 60 feet.

For purposes of this invention, "dowel bar" means any solid bar having a smooth exterior surface. Dowel bar is manufactured with a variety of cross-sectional shapes, including circular, square, rectangular, hexagonal, and octagonal shapes.

In the context of the presented invention, "pipe" or "tubing" means any hollow elongated cylinder used to contain a liquid or pressurized gas substance during transport. Such pipes or tubes may have a diameter between ½ inch and 96 inches, depending upon the end-use application, and often are manufactured in 40-foot lengths.

As used within this application, "coating" or "coated" means any protective or decorative surface finish applied to a work piece by means of powder spray or liquid spray. Such powder sprayed compounds include fusion bond epoxy resins, as well as acrylic, nylon, phenolic, polyethylene, polyester, and vinyl resins. Such liquid spray compounds include paint, lacquer, varnish, abrasive-resistant coatings, and galvanizing products.

Figure 1:
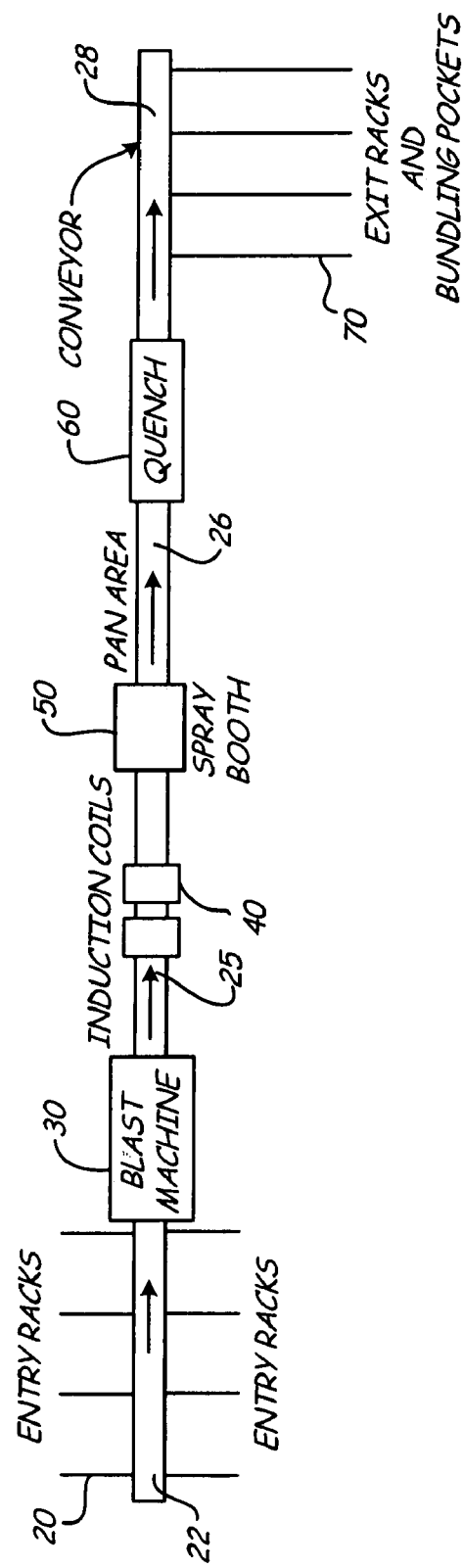
FIG. 1 is a schematic of a manufacturing process for surface cleaning and applying a protective coating to rebar or pipe.

FIG. 1 shows the overall process of the present invention in which a work piece is provided with a spray powder coating to form a protective exterior finish. Work pieces 10 are moved by conventional means from a storage facility to entry racks 20 where they are sorted into, e.g., eight strands lined up in parallel over a loading mechanism for the entry conveyor 22. Depending upon the size and weight of the work pieces, such conventional means for introducing the work pieces 10 to the entry rack 20 can include human lifting, a crane, fork lift, gravity-type conveyor, reciprocating mechanical lift arm, etc.

Upon departure from the entry racks 20, entry section 22 of conveyor line 25 will transport the work pieces 10 to blast machine 30, where the exterior surface of the work pieces 10 are cleaned by means of grit particles thrown at the work pieces at high velocity. In the case of rebar, this might constitute steel grit particles for cleaning surface rust and mill scale off the rebar.

Next, the cleaned work pieces 10 are conveyed longitudinally by means of coating conveyor line section 24 to induction coil heating station 40 which uses electric current to heat the surface of each work piece. The work pieces 10 are then almost immediately passed through spray booth 50 where a powder coating is sprayed onto the work pieces using electrostatic guns that emit a mixture of powder and compressed air.

Upon exit from the spray booth, the work piece strands 10 are conveyed longitudinally by wet roller section 26 of conveyor line 25 to a submersible quench tank 60. The rollers of wet roller section 26 are kept wet with water to eliminate any tracking of the powder coating onto the conveyor components. During the time period that the work pieces are passing through this section of the conveyor line 25, the powder coating will flow and gel across the exterior surface of the work pieces 10 to provide an even protective coating in terms of surface coverage and thickness. Quench tank 60 is filled with cold water, and is used to rapidly reduce the temperature of the work pieces 10 as they continue traveling down the conveyor line.

After completely exiting the quench tank 60, and passing through an in-line holiday (defect) detector, the work pieces 10 are lifted off of the coating conveyor 25 by conventional means, and placed directly onto the exit rack chain conveyor 70.

The coating conveyor line 25 and associated process will now be discussed in greater detail within the context of providing a protective coating to rebar, although it should be understood that this invention is not limited to rebar or applying powder coatings to such rebar. Rather a variety of different process steps can be applied to a multitude of different work pieces using the improved conveyor line of the present invention.

Figure 2:
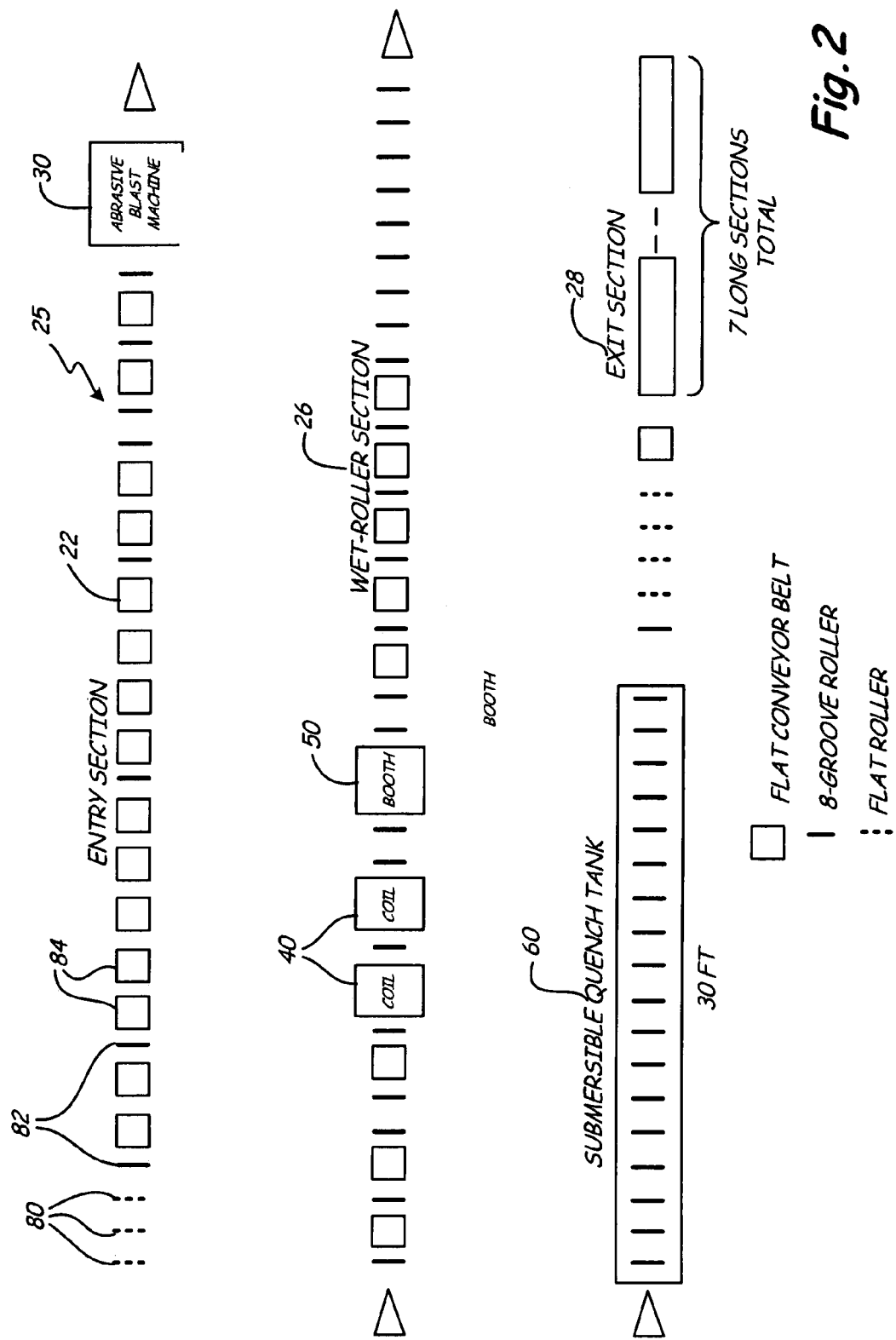
FIG. 2 is a schematic of the manufacturing process of FIG. 1 further representing the different combinations of conveyor line elements of the present invention located between the different work stations of the process.

FIG. 2 shows coating conveyor line 25 in greater detail with particular emphasis placed upon the composition of entry section 22, coating section 24, wet roller section 26, and exit section 28. Bundles of bare steel rebar are taken out of the storage racks by means of an overhead crane and positioned onto entry racks 20. Here, the bundles are broken open and then sorted so that eight strands of bar are lined up in parallel over the loading mechanism for entry section 22 of coating conveyor line 25. The loader transfers the eight strands of rebar onto entry section 22. It should be understood that the number of rows of rebar traveling longitudinally down coating conveyor line 25 may be a number other than eight. While eight is a convenient number for smaller rebar of 3/8 inches or 4/8 inches diameter, larger rebar of 1¼ inch diameter may more effectively be placed in four rows on the conveyor line 25. It is important that enough space exist between the moving strands of rebar to permit effective abrasion clearing and spray coating of the rebar surfaces as discussed more fully herein.

Figure 3:
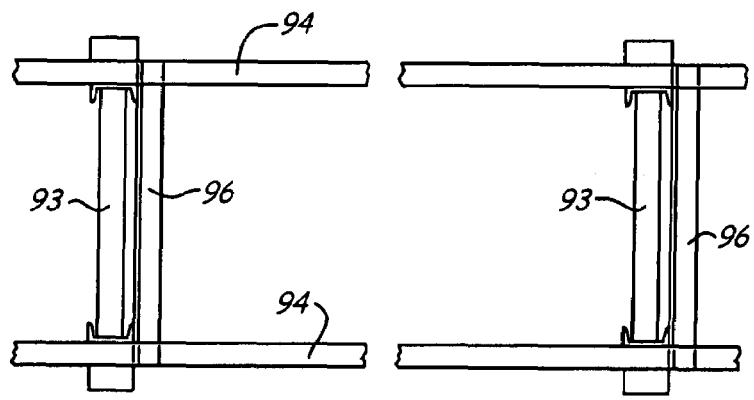
FIG. 3 is a plan view of the support frame for a conveyor line of the present invention.
Figure 4:
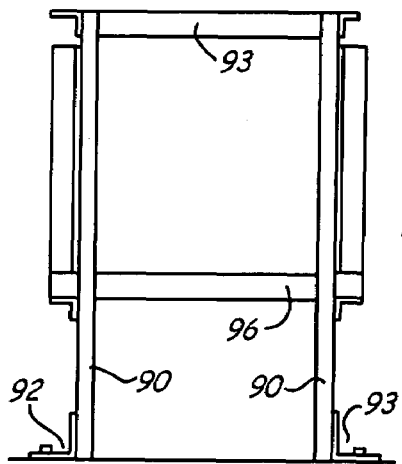
FIG. 4 is an end elevation of the support frame shown in FIG. 3.
Figure 5:
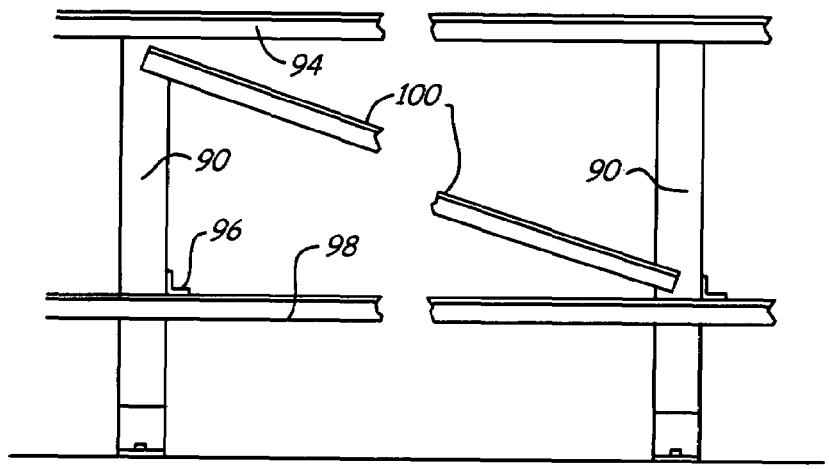
FIG. 5 is a side elevation of the support frame shown in FIG. 3.

Entry section 22 consists of a series of flat rollers 80, grooved rollers 82, and flat conveyor belts 86, as shown in FIG. 2. FIGS. 3-5 illustrate the framework 88 for entry section 22, which consists of a series of seven-foot-long sections. Four-inch channel posts 90 extend vertically from the floor, and are bolted thereto by means of brackets 92. They support on their top surface cross rails 93, and side rails 94, which are L-shaped and 2 inches along each side. Lateral bracing 96, longitudinal bracing 98, and diagonal cross bracing 100 provide needed support to the framework, and bear the downward and outward forces applied by the weight of the rollers, conveyor belts, and traveling rebar. The resulting framework 88 provides an open top surface that is approximately 21½ inches wide (25½ inches between the exterior edges of side rails 94), and approximately 38 inches above the floor for ergonomic convenience.

Mounted on top of side rails 94 are three flat rollers 80, eight grooved rollers 82, and fifteen flat conveyor belt sections 84 that collectively comprise entry section 22. While this number and arrangement of rollers and conveyor belts has been found to work effectively for ordering, spacing, and conveying 60-foot long lengths of rebar to abrasive blast machine 30, the number and arrangement of these components could be readily modified by a person skilled in the art for shorter lengths of rebar or other types of work pieces.

Figure 6:
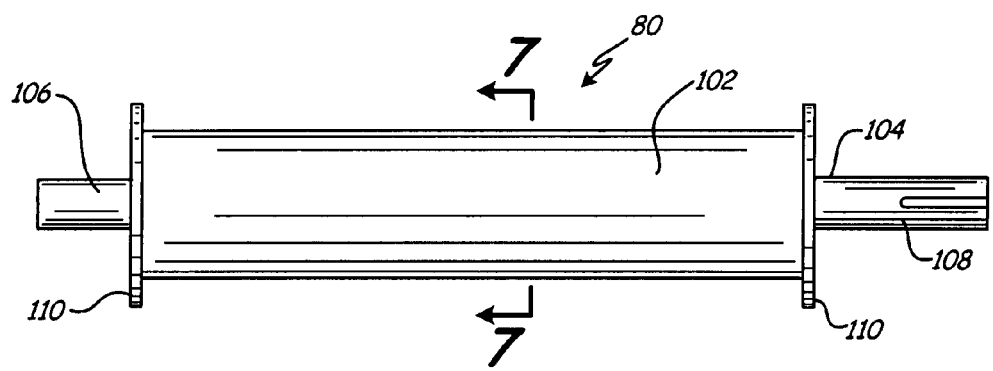
FIG. 6 is side view of a flat roller of the present invention.
Figure 7:
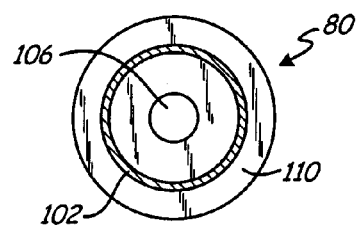
FIG. 7 is an end view of the flat roller shown in FIG. 6.

FIGS. 6 and 7 illustrate the design of flat rollers 80. Each flat roller comprises a steel roller cylinder 102 that is approximately 20 inches in length and 4½ inches in outside diameter. Passing through the length of roller cylinder 102 is a 1-7/16 inch shaft 104 that extends approximately 3 inches past one end of the roller to form a solid end 106 and 5½ inches past the other end of the roller to form keyed end 108. Guide rings 110 are mounted on each end of roller cylinder 102 and have a larger diameter than roller 102 sufficient to trap any rebar that would otherwise move laterally and fall off the roller to the floor, while traveling in the longitudinal direction.

Flat roller 80 is securely mounted to side rails 94 by means of a pillow block bearing 110 that engages solid end 106 of shaft 104 and a bearing and sprocket assembly 114 that engages keyed end 108 of shaft 104. The purpose of flat rollers 80 is to provide forward longitudinal force to the rebar strands at the beginning stage of entry section 22 of conveyor line 25 when precise lateral spacing of the individual rebar strands is less important than later along the conveyor line.

Figure 8:
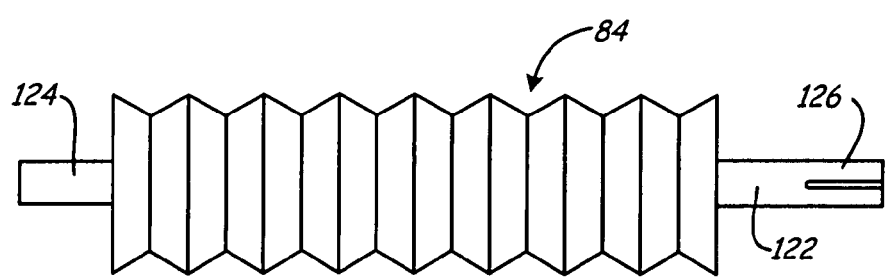
FIG. 8 is a side view of a grooved roller of the present invention bearing V-shaped channels.
Figure 9:
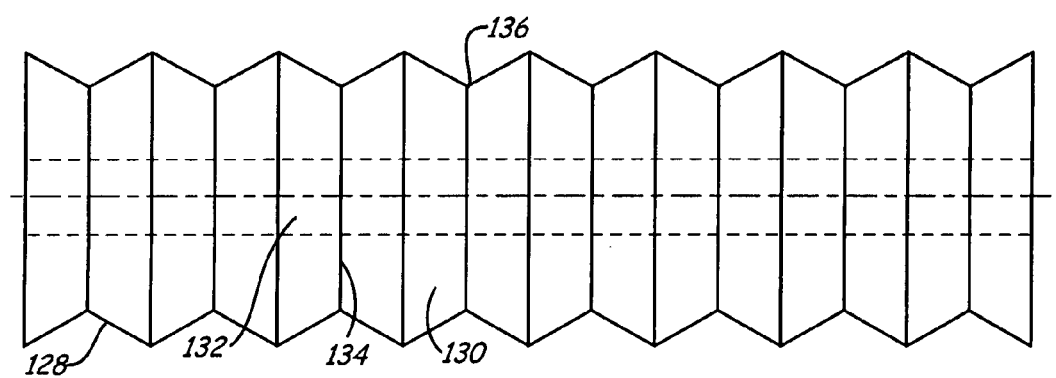
FIG. 9 is a plan view of the grooved roller portion of the grooved roller shown in FIG. 8.

FIGS. 8 and 9 show grooved rollers 82. Like flat roller assembly 80, grooved roller assembly 82 comprises a roller 120, shaft 122 having solid end 124 and keyed end 126. Also like flat roller assembly 80, grooved roller assembly 82 is mounted to top rails 94 by means of pillow block bearings 112 and bearing and sprocket assemblies 114. However, the otherwise cylindrical surface of roller 120 has a series of, e.g., eight V-grooves 128 machined into its surface to form V-grooved channels 130 that extend laterally across roller 120 in the longitudinal direction of the traveling rebar. So that V-grooved rollers may accommodate a variety of different diameters of rebar, such V-grooved channels 130 are approximately six inches across their top edge 132, approximately 4½ inches across their bottom edge 134, and approximately ¾ inches in depth 136. Roller 120 and V-grooves 128 preferably are made from nylon since it is easier to machine nylon, although steel may be used. The purpose of grooved rollers 82 is to maintain precise lateral alignment of the rebar strands as they are conveyed along entry section 22 of conveyor line 25.

Figure 10:
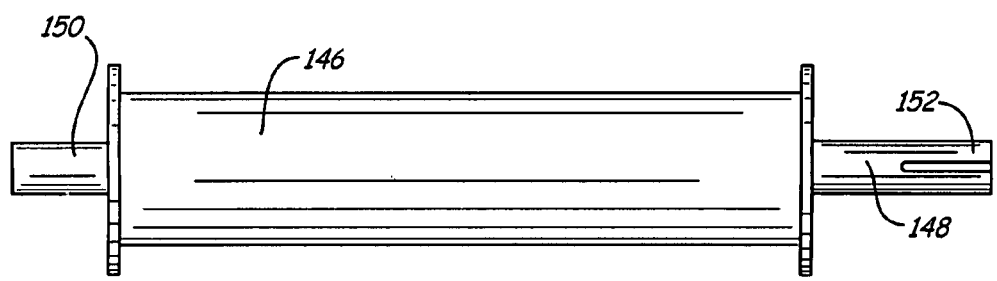
FIG. 10 is a side view of the roller portion of the flat conveyor belt of the present invention.
Figure 11:
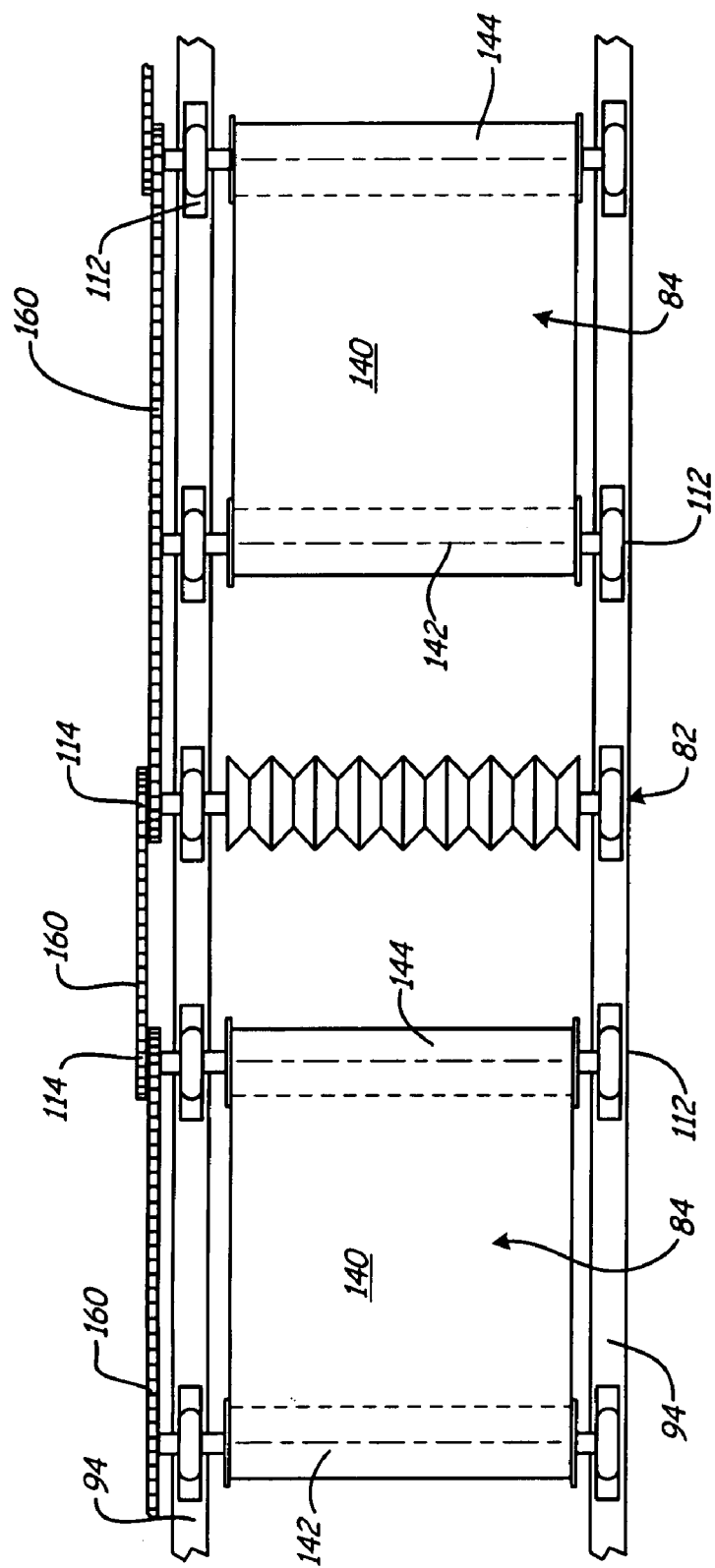
FIG. 11 is a plan view of the conveyor line of the present invention containing two flat conveyor belt elements and one grooved roller element for purposes of illustration.

Flat conveyor belts 84 are shown in FIGS. 10 and 11. FIG. 11 also shows two sections of flat conveyor belt 84 in combination with one grooved roller 82. Each flat conveyor belt 84 comprises a belt 140 stretched between an idle roller 142 and a drive roller 144. The belt 140 is preferably made from butyl rubber with four plies rated at 200 lb./sq. in capacity. The temperature rating for this material is 250° F. Rollers 140 and 144 look very similar to the construction of flat rollers 80, having cylindrical roller 146 and shaft 148. However, the shaft 148 ends in two solid ends 150 for mounting to top rails 94 by means of pillow block bearings 112. The shaft 148 of driver roller 144, on the other hand, ends in solid end 150 and keyed end 152 so that it can be mounted to top rails 94 by means of pillow block bearing 112 and sprocket assembly 114, respectively. Belt 140 is approximately 20 inches wide, and has a center-to-center length of approximately 19½ inches.

The purpose of flat conveyor belt 84 is to dampen the rotation of a rebar strand as it comes off of a grooved roller 82. A series of chain drives 160 are operatively engaged between the sprockets ends of a flat roller 80, grooved roller 82, or driver roller 144 of a flat conveyor belt 84 to move these rollers and belts in a synchronized fashion powered by a motor (not shown), so that eight strands of rebar can be moved along entry section 22 to abrasive blast machine 30 in precisely laterally spaced alignment without rotation of the individual rebars. It has been found that spacing between the flat conveyor belts 84 and grooved rollers 82 of approximately 14½ inches achieves this objective, which also provides sufficient longitudinal support of smaller diameter rebars that might otherwise be subject to bending or drooping.

Abrasive blast machine 30 comprises a cabinet approximately four feet long without any rollers or conveyor belts positioned therein. A rotating series of paddles within the booth throw steel grit particles at high velocity at the rebar strands whose exterior surface is accessible from all directions. The steel grit particles are at least 95% iron, and may be sourced from Ervin Industries of Ann Arbor, Mich. or Wheelabrator Abrasives of Bedford, Va. Such abrasive blast machines are known in the art, and the components for the machine of the present invention were sourced from Midwest Pipe Coating, Inc. of Schererville, Ind.; Blastec, Inc. of Alpharetta, Ga., and Industrial Associates, Inc. of Waukesha, Wisc. It has been found that the four-foot length of abrasive blast machine 30 provides sufficient residence time for rebar traveling through it at approximately 24-56 feet/minute to achieve thorough cleaning of the surface rust and mill scale from the rebars by means of the steel grit particles.

Upon exit from the abrasive blast machine 30, the rebar strands are conveyed to induction coil heating station 40 by means of coating section 24 of conveyor line 25. As shown in FIG. 2, this portion of coating section comprises five grooved rollers 82 and three flat belt conveyors 84. Induction coil heating station 24 preferably consists of two separate stations in series with a grooved roller 82 positioned in between. Each such station comprises an induction coil which introduces electric current to the rebar strands passing thereunder in order to heat the surface of each rebar to approximately 450° F. Such induction coils are known in the art, and the ones used in the present invention were manufactured by Pillar Industries of Brookfield, Wisc. The distance across each induction heating coil station is approximately two feet.

Upon leaving the induction coil heating stations 40, the rebar strands are conveyed by means of two more grooved rollers 82 to spray booth 50. This coating chamber comprises a booth approximately four feet in length that was purchased from G&R Electro-Powder Corp. of Indianapolis, Ind. Electrostatic spray guns sourced from Nordson Corp. of Amherst, Ohio are mounted within the booth for emitting a cloud of powder coating at the rebar strands as they pass therethrough. The absence of rollers or flat conveyor belts inside the booth permit this powder coating to be electrostatically attracted to the surface across the entire diameter of each rebar in transit whereupon it coats the rebar surface. Overspray of the powder is continuously reclaimed from the coating booth for reuse in the coating process.

For purposes of rebar, a fusion bond epoxy powder is preferably used. Two such products are SCOTCHKOTE® 413 spray-grade fusion-bonded epoxy coating (70-90% 4,4'-isopropylidenediphenol-epichlorohydrin polymer) manufactured by 3M Company of St. Paul, Minn., and GREENBAR® 720A009 powder paint (90-95% of a "proprietary resin") manufactured by Valspar Corporation of Minneapolis, Minn. For purposes of coating pipe, 3M's SCOTCHKOTE® 6233 fusion-bonded epoxy coating (55-75% di(4-hydroxyphenol)isopropylidene-di(4-hydroyphenol) isopropylidene copolymer) or the GREENBAR 720A009 material may be used. These powders are applied to the rebar or pipe by the electrostatic guns at a rate of approximately one pound per minute (per gun) in order to achieve a uniform coating thickness of approximately 5-60 mils (i.e., 0.005-0.60 inches). While liquid coatings may alternatively be used within the intended scope of this invention, powder coatings tend to cure faster than liquid coatings. They also permit the recycling of overspray, which can improve processing economics. Therefore, powder coatings applied electrostatically are preferred for purposes of coating rebar and pipe.

The combination of grooved rollers 82 and flat conveyor belts 84 of the coating section 24 shown in FIG. 2 cooperate to convey the rebar strands to and through coating chamber 50 in precisely laterally spaced alignment without the rotation that would otherwise be imparted by the grooved rollers, alone, so that uniform coverage and thickness of protective coating can be introduced to the rebar surfaces as they pass through the coating chamber. The construction of the guide rollers 82 and flat conveyor belts 84 of coating section 24 are the same as those of entry section 22 described above, and will not be repeated again.

The rebar strands leave the coating chamber 50 by means of wet roller section 26 whereupon they are conveyed to quench tank 60. As shown in FIG. 2, wet roller section 26 of conveyor line 25 comprises a series of grooved rollers 82 and flat conveyor belts 84. The flat conveyor belts are used in the first half of wet roller section 26 where it is still important to dampen down any rotational force on the lead portion of the rebar strands, so that rotation that would otherwise affect the rebar strands does not interfere with the uniform coating of the latter portion of the strands as they pass through the coating chamber 50. This is no longer an issue in the latter part of wet roller section 26, or quench tank 60 for that matter, so grooved rollers alone are used in those portions of conveyor line 25.

The flat conveyor belts and grooved rollers in the wet roller section 26 are kept wet in order to eliminate any tracking of the coating powder onto the conveyor components. This section provides a sufficient period of time as the rebar strands pass therethrough for the coating to flow and gel evenly across the rebar to further ensure uniform coverage and thickness, as well as to start to cure. For example, the SCOTCHKOTE 413 powder is rated for a gel time of 4-5 seconds with a time-to-quench of 27 seconds. It has been found that a wet roller section approximately 30 feet in length accomplishes this purpose.

The rebar strands then are conveyed to quench tank 60 whereupon they are completely immersed in cooling water as they travel down the coating conveyor line 25. This quench tank 60 is approximately 26 feet long, and serves to reduce the surface temperature of the rebar strands to approximately 180° F. as they exit the tank.

The rebar strands completely exit the quench tank area and pass through an inline holiday (defect) detector by means of exit section 28, which consists primarily of flat rollers 80 and flat conveyor belts 84, since precisely spaced lateral alignment of the rebars is no longer important. The rebar strands are then lifted off of exit section 28 of coating conveyor line 25 by means of an exit transfer cart assembly (not shown) of conventional design, and placed directly onto exit rack chain conveyor 70. This chain conveyor 70 moves the rebar strands laterally to the exit bundling pockets, where the individual strands are bound back together in a bundle, and hauled via an overhead crane to the storage racks.

It is important downstream of coating chamber 50 that the components of wet roller section 26, quench tank 60, exit section 28, and the exit rack chain conveyor not chip or otherwise mar the protective coating that has been applied to the exterior surface of the moving rebar strands. Therefore, the grooved rollers 82 and flat rollers 80 which have a steel core, are coated with an ultra-high molecular weight ("UHMW") plastic material, or could be coated with polyurethane or nylon as a substitute, although UHMW plastic is the preferred coating material. In this manner, the coated rebar strands may be safely conveyed over these rollers without damage to the coatings. For the same reason, the crane lifts the rebar strands with a nylon web sling off of the exit rack chain conveyor to the storage racks. From here, the rebar can be shipped to a customer or further processed.

Table 1 provides illustrative data for the number of strands conveyed and line speed for different sized rebars in accordance with the present invention.

TABLE 1

| Bar Size | Nominal Diameter (inches) | No. of Strands | Speed (ft./min.) |
|---|---|---|---|
| #3 | 3/8 | 8 | 50-51 |
| #4 | 1/2 | 8 | 50-56 |
| #5 | 5/8 | 8 | 49-53 |
| #6 | 3/4 | 8 | 41-44 |
| #7 | 7/8 | 8 | 36-39 |
| #8 | 1 | 8 | 30-33 |
| #9 | 1 1/8 | 6 | 26-30 |
| #10 | 1 1/4 | 4 | 24-26 |
| #11 | 1 3/8 | 4 | 24 |

The above specifications, data and drawings provide a complete description of the manufacture and use of the apparatus and process of the invention. Many alternative embodiments of the invention can be made without departing from the spirit and scope of the invention. For example, other work pieces besides rebar can be processed by the apparatus and process of the present invention. Likewise, a processing step other than surface coating may be applied to the work piece by this invention. Moreover, alternate arrangements and combinations of grooved rollers and flat belt conveyors can be used besides that shown in FIG. 2.

Figure 12:
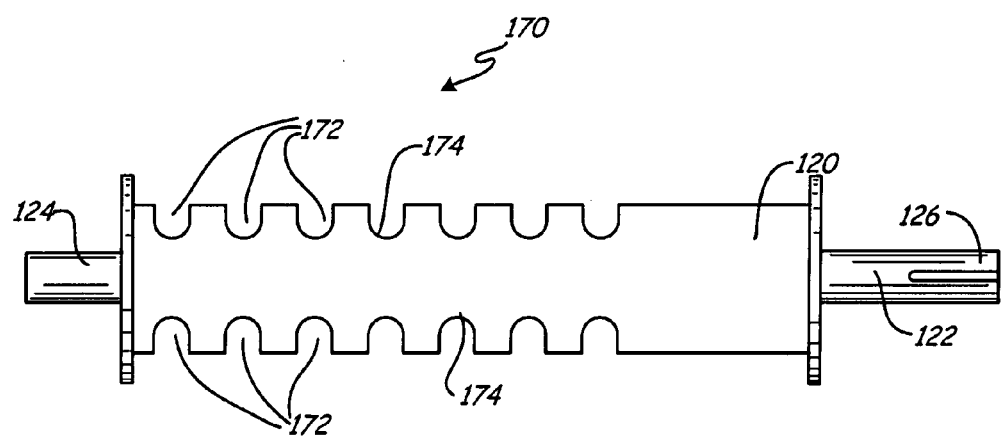
FIG. 12 is a side view of a grooved roller of the present invention bearing U-shaped channels.
Figure 13:
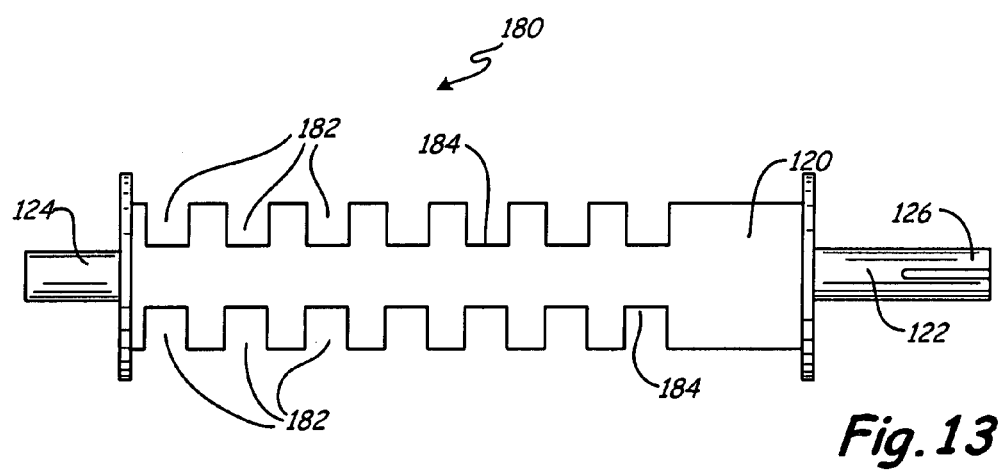
FIG. 13 is a side view of a grooved roller of the present invention bearing square-shaped channels.
Figure 14:
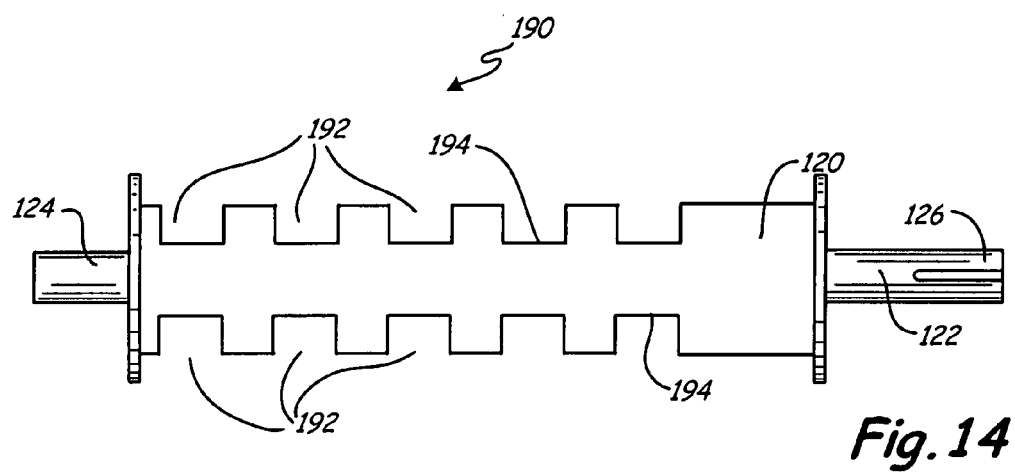
FIG. 14 is a side view of a grooved roller of the present invention bearing rectangular-shaped channels.

Furthermore, other grooved configurations besides V-grooves (e.g., a U-groove or square groove) can be substituted for the grooved rollers that will still retain the work piece in a laterally and rotationally stationary position depending upon the cross-sectional shape of the work piece. For example. FIG. 12 shows an alternative grooved roller embodiment 170 of the present invention in which a series of U-shaped grooves 172 are machined into the roller surface 120 to form U-shaped channels 174 that extend laterally across roller 120 in the longitudinal direction of the traveling rebar. Likewise, FIG. 13 illustrates another alternative grooved roller embodiment 180 of the present invention bearing square-shaped grooves 182 machined into the roller surface to form square-shaped channels 184. Finally FIG. 14 depicts yet another alternative embodiment 190 of the grooved roller 120 in which rectangular-shaped grooves 192 are machined into the roller surface to form rectangular shaped channels 194.

Therefore, the invention resides in the claims hereinafter appended.

I claim:

1. A conveyor system for transporting a work piece from a beginning point to an end point in a longitudinal direction along an axis with a process step applied in between to the work piece, the system comprising:
   (a) frame means located between the beginning point and the end point for supporting two horizontal rails spaced in parallel relation to the axis;
   (b) roller means secured to the horizontal rails and transverse to the longitudinal axis for supporting the work piece and propelling it in between the beginning point and the end point, at least one of the roller means further comprising guide means located along its exterior surface for inhibiting the work piece from moving laterally as it is transported in the longitudinal direction, said at least one roller means exposed such that a work piece directly contacts said guide means;
   (c) at least one flat conveyor belt means secured to the horizontal rails and transverse to the longitudinal axis, and being positioned in between two roller means, such flat conveyor belt means providing support for the work piece and propelling it in between the beginning point and the end point;
   (d) drive means operatively connected to the roller means and conveyor belt means for rotating the roller means and conveyor belt means along their respective axes transverse to the longitudinal axis in a synchronized fashion;
   (e) whereby the flat conveyor belt means inhibits rotation of the work piece around the longitudinal axis as it is transported between the beginning point and the end point.

2. The conveyor system of claim 1, further comprising a cleaning apparatus for cleaning the work piece.

3. The conveyor system of claim 2, wherein the cleaning apparatus comprises an abrasion blast cleaner for cleaning of the exterior surface of the work piece.

4. The conveyor system of claim 1, further comprising a heating apparatus for heating the work piece.

5. The conveyor system of claim 4, wherein the heating apparatus comprises an induction heating coil.

6. The conveyor system of claim 1, further comprising a coating apparatus for providing a coating composition to the exterior surface of the work piece.

7. The conveyor system of claim 6, wherein the coating apparatus comprises a liquid spray coater.

8. The conveyor system of claim 6, wherein the coating apparatus comprises a powder spray coater.

9. The conveyor system of claim 8, wherein the powder spray coater applies a fusion bond epoxy powder to the work piece.

10. The conveyor system of claim 7, further comprising a device for heating the work piece with an electric current prior to its introduction to the coating apparatus so that the powder spray coating is attracted to the work piece surface by electrostatic means.

11. The conveyor system of claim 1, further comprising a cooling apparatus for cooling the work piece.

12. The conveyor system of claim 1 further comprising additional guide means on at least one of the roller means, whereby multiple work pieces may be transported between the beginning point and the end point in parallel alignment without lateral movement of one work piece with respect to another work piece.

13. The conveyor system of claim 1, wherein the guide means comprises a channel formed within the cross section of the roller means parallel to the longitudinal axis.

14. The conveyor system of claim 13, wherein the channel has a V-shaped cross section.

15. The conveyor system of claim 13, wherein the channel has a U-shaped cross section.

16. The conveyor system of claim 13, wherein the channel has a square-shaped cross section.

17. The conveyor system of claim 13, wherein the channel has a rectangular-shaped cross section.

18. The conveyor system of claim 1, wherein the surface of at least one of the roller means further comprises a surface coating to inhibit damage to the work piece surface as the work piece is transported over the roller means.

19. The conveyor system of claim 18, wherein the surface coating of the roller means comprises an ultra-high molecular weight ("UHMW") plastic material.

20. The conveyor system of claim 18, wherein the surface coating of the roller means comprises polyurethane or nylon.

21. The conveyor system of claim 1, wherein the belt portion of the flat conveyor belts means comprises butyl rubber.

22. A process for treating a work piece moving along a conveyor line between a beginning point and an end point in a longitudinal direction along an axis while maintaining the work piece in a controlled orientation with respect to the axis, such process comprising:
  (a) introducing the work piece to a transport plane defined by two horizontal rails spaced in parallel relation to the axis and supported by frame means;
  (b) transporting the work piece over at least one roller means secured to the horizontal rails and transverse to the longitudinal axis, such roller means further comprising guide means located along the exterior surface of the roller means for inhibiting the work piece from moving laterally as it is transported in the longitudinal direction, said at least one roller means exposed such that a work piece directly contacts said guide means;
  (c) transporting the work piece over at least one conveyor belt means secured to the horizontal rails and transverse to the longitudinal access, such conveyor belt means inhibiting rotation of the work piece around the longitudinal axis as it is transported in the longitudinal direction;
  (d) providing drive means operatively connected to the roller means and conveyor belt means for rotating the roller means and conveyor belt means along their respective axes transverse to the longitudinal axis in a synchronized fashion, whereby the work piece is propelled by the roller means and conveyor belt means along the transport plane; and
  (e) providing at least one process step interspersed within the transport plane for treating the work piece as it is transported between the beginning point and the end point.

23. The process of claim 22, wherein the process step is a coating step.

24. The process of claim 23, wherein the coating step comprises a liquid spray coating of the work piece.

25. The process of claim 23, wherein the coating step comprises a powder spray coating of the work piece.

26. The process of claim 25, wherein the powder spray coating comprises a fusion bond epoxy powder.

27. The process of claim 22, wherein the process step consists of cleaning, painting, varnishing, other types of metal treatment, heating, curing, or cooling.

28. The process of claim 22, wherein the work piece is rebar.

29. The process of claim 22, wherein the work piece is dowel bar.

30. The process of claim 22, wherein the work piece is hollow pipe.

31. The process of claim 22, wherein the work piece is tubing.

32. The process of claim 22, wherein multiple work pieces may be transported between the beginning point and the end point in parallel alignment without lateral movement of one work piece with respect to another work piece, such work pieces being treated by the process step.

* * * * *